United States Patent [19]

Kodama et al.

[11] Patent Number: 4,695,268
[45] Date of Patent: Sep. 22, 1987

[54] AUTOMATIC TENSIONER HAVING LOCKING MECHANISM

[75] Inventors: Hisashi Kodama, Nagoya; Yoshio Okabe, Chiryu, both of Japan

[73] Assignee: Aisin Seiki Kabushiki Kaisha, Kariya, Japan

[21] Appl. No.: 925,112

[22] Filed: Oct. 29, 1986

[30] Foreign Application Priority Data

Oct. 29, 1985 [JP] Japan ................................ 60-166452

[51] Int. Cl.$^4$ ............................................. F16H 7/08
[52] U.S. Cl. .................................................. 474/110
[58] Field of Search ............... 474/110, 109, 103, 104, 474/101

[56] References Cited

U.S. PATENT DOCUMENTS 4,507,103  3/1985  Mittermeier ........................ 474/110
4,527,462  7/1985  Okabe ............................. 474/110 X
4,539,001  9/1985  Okabe ............................. 474/110 X Primary Examiner—Stephen J. Novosad
Assistant Examiner—Thuy M. Biu
Attorney, Agent, or Firm—Oblon, Fisher, Spivak, McClelland & Maier

[57] ABSTRACT

An automatic tensioner for adjusting the tension in a timing belt, V belt, or the like has a locking mechanism. The tensioner has a plunger always biased toward a large oil chamber containing oil. A rod having a head that is pressed against the timing belt or the like is inserted in the body of the tensioner so as to form a small oil chamber. A piston is received in the body of the tensioner. Normally, the piston bears against the plunger. If oil should leak from the large oil chamber, then the plunger will move downward, permitting the piston to engage the rod. Thus, the rod is locked.

3 Claims, 6 Drawing Figures

AUTOMATIC TENSIONER HAVING LOCKING MECHANISM

FIELD OF THE INVENTION

The present invention relates to an automatic tensioner for adjusting the tension in a timing belt, V belt, or the like and, more particularly, to a locking mechanism for use with such a tensioner.

BACKGROUND OF THE INVENTION

The conventional manner in which an automatic tensioner is installed is shown in FIG. 5. The tensioner, indicated by reference numeral 1, has a rod 4 that is slidably inserted in a cylinder 3. This cylinder 3 is fixed to a bracket 2 with a nut 3a. An idler 6 makes a rocking movement about a pivot 5. The idler 6 with which the front end of the rod 4 is in contact is pressed against a belt 7 by the rod 4 to apply a tension to it.

A conventional automatic tensioner has been proposed in Japanese Patent Laid-Open No. 126144/1984. This tensioner is now described by referring to FIG. 6, where a plunger 9 is slidably inserted in the body 8 of the tensioner. A sealed oil chamber 10 having a large diameter is formed at the bottom of the body, and contains oil. The plunger 9 is biased toward the oil chamber 10 by a spring 13 which is mounted between a snap ring 11 and the step portion 12 of the plunger 9. The ring 11 is mounted in the opening of the body 8. The plunger 9 is centrally provided with a hole 14 in which a piston 15 is inserted so as to be slidable. A small hole 17 extends from the bottom of the hole 14, so that the large oil chamber 10 is in communication with a small oil chamber 16.

In the conventional structure shown in FIG. 6, if the oil contained in the oil chambers 10 and 16 should leak, then the plunger 9 and the rod 15 would free to move their full stroke. Then, the rod 15 would hardly be pressed against the belt. Especially, if the belt is a toothed belt, positive engagement is not assured, leading to an engine trouble or other problem.

SUMMARY OF THE INVENTION

Accordingly, it is an object of the present invention to provide an automatic tensioner equipped with a locking mechanism which can lock the rod even if the oil contained in the oil chambers leaks.

The above object is achieved by an automatic tensioner having a locking mechanism, comprising: a large oil chamber formed at the bottom of the body of the tensioner and containing oil; a plunger biased toward the large oil chamber by a spring and inserted in the body so as to be slidable; a hole formed at the center of the plunger; a rod having a head that protrudes from the body of the tensioner, the rod being slidably inserted in the hole so as to form a small oil chamber containing oil, the small oil chamber being in communication with the large oil chamber through a narrow passage, the end surface of the head of the rod being pressed against an external device or element, such as a belt; and a piston which is received in the body of the tensioner and normally biased into contact with the plunger and which, when oil leaks from the large oil chamber to thereby lower the plunger, is permitted to protrude into engagement with the rod, locking the rod.

When a certain amount of oil is contained in the large oil chamber, the plunger is raised. This prevents the piston from protruding. The front end of the rod is pressed against a belt or the like, and the automatic tensioner operates normally. If oil leaks from the large oil chamber, the plunger moves downward, allowing the piston to protrude. Then, the piston engages the rod, thus locking the rod. In this way, the force applied to the belt or the like from the front end of the rod does not decrease.

Other objects and features of the invention will appear in the course of the description thereof which follows.

DETAILED DESCRIPTION OF THE INVENTION

Figure 1:
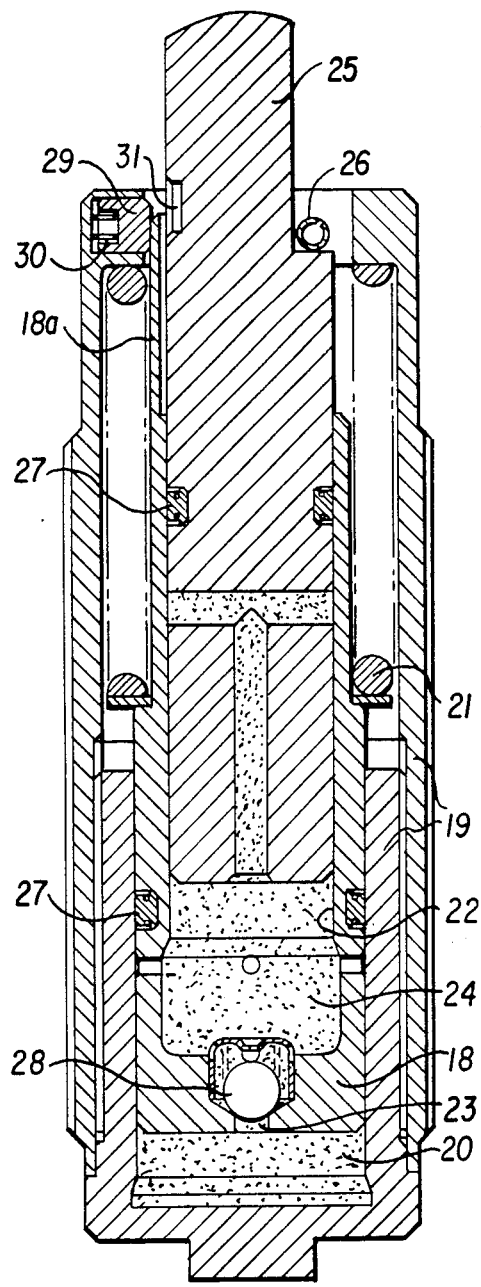
FIGS. 1, 2, and 3 are side elevations in cross section of an automatic tensioner according to the invention, for showing different conditions of operation.
Figure 2:
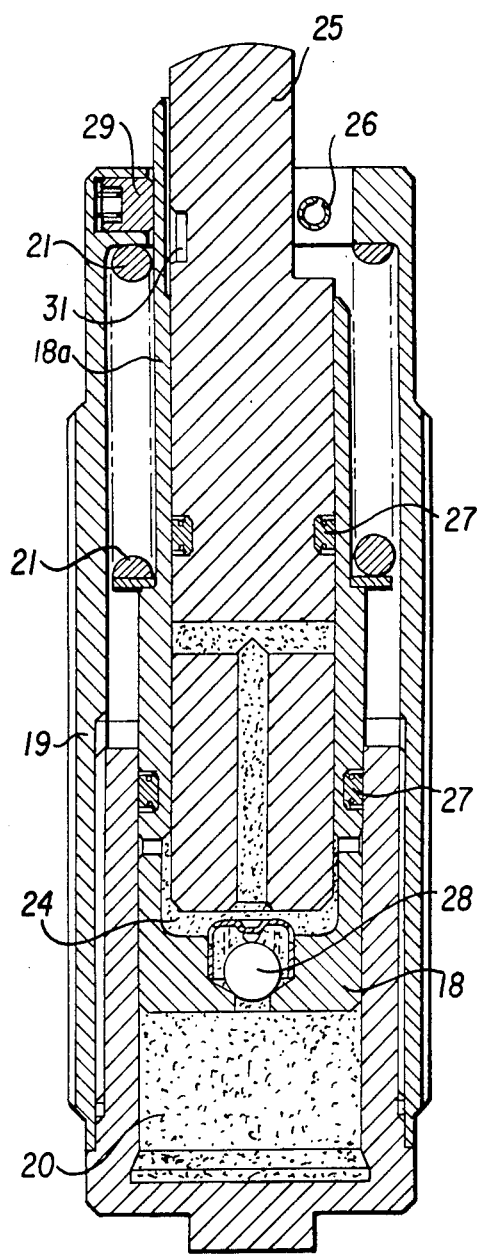

Referring to FIGS. 1 and 2, there is shown an automatic tensioner according to the invention. In the state shown in FIG. 1, the rod (described later) of the tensioner is free to move. In the state shown in FIG. 2, the tensioner is utilized fully. The tensioner has a plunger 18 which is inserted in the body 19 of the tensioner so as to be slidable. An oil chamber 20 having a large diameter is formed at the bottom of the body 19. Oil is contained in the chamber 20. The plunger 18 is biased toward the chamber 20 by a spring 21, and is centrally provided with a hole 22 in which a rod 25 is inserted so as to be slidable and to form a small oil chamber 24 containing oil. The small chamber 24 is in communication with the large chamber 20 via a small passage 23. A spring pin 26 acts to prevent the rod 25 from rotating, and also serves as a stopper. Also shown are a seal member 27 and a check valve 28.

A piston 29 is biased into the upper portion of the body 19 by a spring 30. A hole 31 that the piston engages when it protrudes is formed in one side surface of the rod 25 at a high position. One side surface 18a of the plunger 18 extends upward. When the tensioner assumes the state shown in FIGS. 1 or 2, the side surface 18a is raised to such a position that it engages the piston 29.

Figure 3:
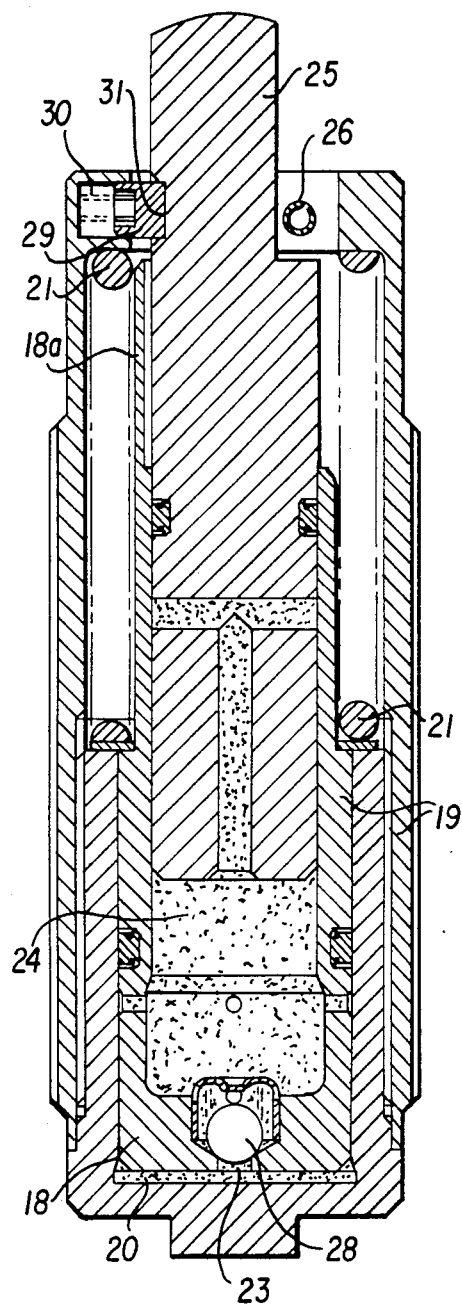

In the operation of the tensioner constructed as described above, it is now assumed that the tensioner takes the state shown in FIG. 1, i.e., the rod is free to move. If oil leaks from the large chamber 20, then the plunger 18 drops as shown in FIG. 3. Then, the piston 29 is pushed forward and comes into contact with the side surface of the rod 25. At this time, the rod 25 also begins to move downward. When the hole 31 reaches the position of the piston 29, the piston 29 is fitted into the hole 31. This stops further downward movement of the rod 25, i.e., the rod 25 is locked. Consequently, the tensioner is maintained at a certain length.

Figure 4:
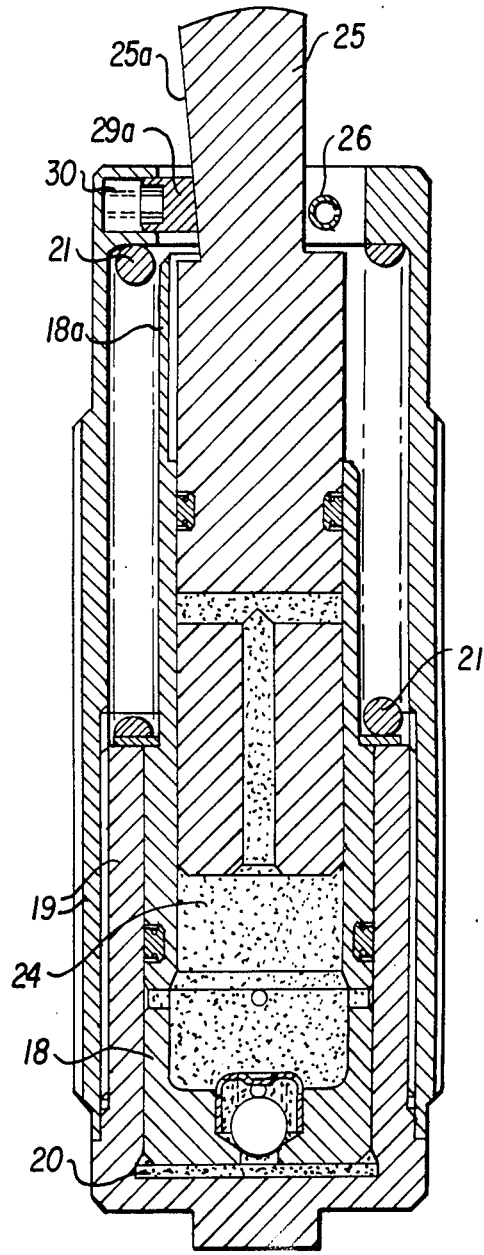
FIG. 4 is a side elevation in cross section of another automatic tensioner according to the invention.
Figure 5:
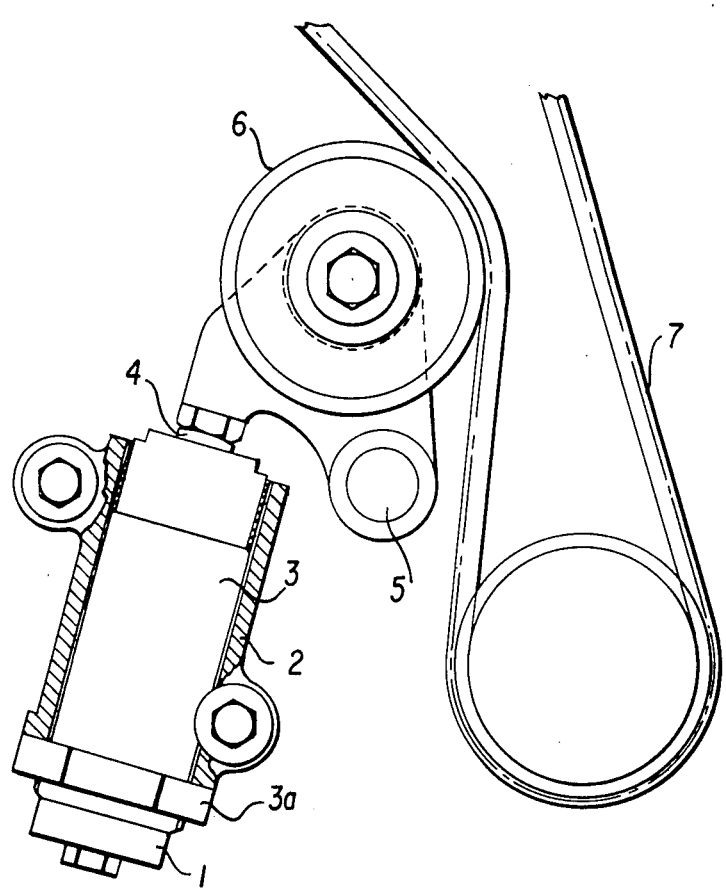
FIG. 5 is a side elevation of an automatic tensioner, for showing the conventional manner in which it is mounted.
Figure 6:
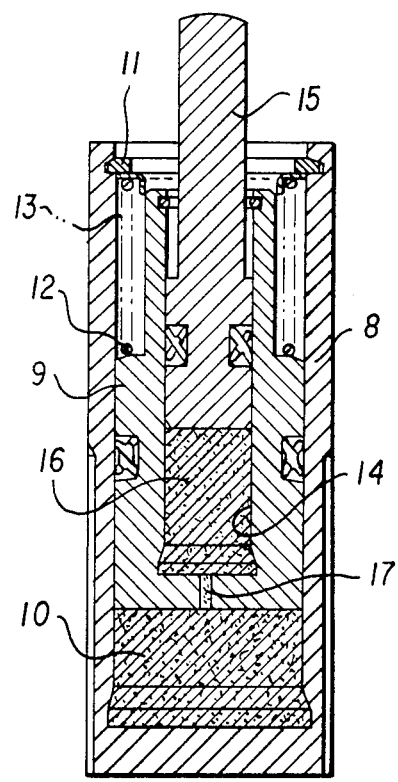
FIG. 6 is a side elevation in cross section of a conventional automatic tensioner.

Referring next to FIG. 4, there is shown another automatic tensioner according to the invention. This tensioner is similar to the tensioner already described except for the following. The rod 25 has an inclined surface 25a against which the inclined surface of a piston 29a can bear. The rod 25 can be locked at a desired position by moving the piston 29a forward into engagement with the inclined surface 25a.

In the novel tensioner constructed as described above, if oil leaks from the large oil chamber to thereby lower the plunger, then the piston is pushed forward into engagement with the rod, locking the rod. Thus, the tensioner is maintained at a certain length. Hence, nonpositive engagement of a toothed belt or any other trouble which has been heretofore encountered can be prevented.

What is claimed is:

1. An automatic tensioner having a locking mechanism, comprising:
    a large oil chamber formed at the bottom of a body of the tensioner and containing oil;
    a plunger biased toward the large oil chamber by a spring and inserted in the body so as to be slidable;
    a hole formed at the center of the plunger;
    a rod having a head that protrudes from the body of the tensioner, the rod being slidably inserted in the hole so as to form a small oil chamber containing oil, the small oil chamber being in communication with the large oil chamber through a narrow passage, the end surface of the head of the rod being pressed against an external device or element, such as a belt; and
    a piston which is received in the body of the tensioner and normally biased into contact with the plunger and which, when oil leaks from the large oil chamber to thereby lower the plunger, is permitted to protrude into engagement with the rod, locking the rod.

2. The automatic tensioner of claim 1, wherein said rod is provided with a hole that said piston engages.

3. The automatic tensioner of claim 1, wherein said rod has an inclined surface that said piston engages.

* * * * *

UNITED STATES PATENT AND TRADEMARK OFFICE
CERTIFICATE OF CORRECTION

PATENT NO. : 4,695,268

DATED : 09/22/87

INVENTOR(S) : Hisashi KODAMA et al.

It is certified that error appears in the above-identified patent and that said Letters Patent is hereby corrected as shown below:

Column 1, line 37, after "would" insert --be--;

and Column 3, line 15, change "a body" to --the body--.

Signed and Sealed this

Tenth Day of May, 1988

Attest:

DONALD J. QUIGG

Attesting Officer

Commissioner of Patents and Trademarks